(12) United States Patent
Kim et al.

(10) Patent No.: US 12,485,336 B2
(45) Date of Patent: Dec. 2, 2025

(54) METHOD FOR PROVIDING OPTIMAL PUTTING PATH

(71) Applicant: VROTEIN INC., Suwon-si (KR)

(72) Inventors: Chan Ki Kim, Gwangju-si (KR); Sung Hyun Mun, Gwangmyeong-si (KR)

(73) Assignee: VROTEIN INC., Suwon-si (KR)

( * ) Notice: Subject to any disclaimer, the term of this patent is extended or adjusted under 35 U.S.C. 154(b) by 174 days.

(21) Appl. No.: 18/505,276

(22) Filed: Nov. 9, 2023

(65) Prior Publication Data

US 2025/0128139 A1    Apr. 24, 2025

(30) Foreign Application Priority Data

Oct. 19, 2023    (KR) .................. 10-2023-0140244

(51) Int. Cl.
| | | |
|---|---|---|
| *A63B 71/06* | (2006.01) | |
| *A63B 24/00* | (2006.01) | |
| *A63B 69/36* | (2006.01) | |
| *A63B 102/32* | (2015.01) | |

(52) U.S. Cl.
CPC ...... *A63B 71/0622* (2013.01); *A63B 24/0021* (2013.01); *A63B 69/3676* (2013.01); *A63B 2024/0056* (2013.01); *A63B 2102/32* (2015.10)

(58) Field of Classification Search
None
See application file for complete search history.

(56) References Cited

U.S. PATENT DOCUMENTS

| | | | | |
|---|---|---|---|---|
| 4,972,504 A * | 11/1990 | Daniel, Jr. | ......... | G06Q 30/0205 455/2.01 |
| 6,254,492 B1 * | 7/2001 | Taggett | ............. | A63B 69/3623 473/219 |
| 6,774,932 B1 * | 8/2004 | Ewing | ................... | H04N 5/262 348/157 |
| 7,713,148 B2 * | 5/2010 | Sweeney | ............ | A63B 24/0021 348/157 |
| 8,335,345 B2 * | 12/2012 | White | ................ | A63B 24/0021 348/169 |
| 8,409,024 B2 * | 4/2013 | Marty | ................ | A63B 24/0003 356/28 |
| 9,921,076 B2 * | 3/2018 | Togasaka | ................ | G01S 19/19 |
| 10,207,170 B2 * | 2/2019 | Penn | .................. | G06Q 10/0639 |
| 10,213,645 B1 * | 2/2019 | Wu | .................... | A63B 24/0003 |

(Continued)

FOREIGN PATENT DOCUMENTS

| | | | |
|---|---|---|---|
| JP | 2014.508625 | * | 4/2014 |
| KR | 10-2330220 B1 | | 11/2021 |

(Continued)

*Primary Examiner* — Paul A D'Agostino
(74) *Attorney, Agent, or Firm* — Dinsmore & Shohl LLP; Yongsok Choi, Esq.

(57) ABSTRACT

The present disclosure relates to a method for providing an optimal putting path performed by a system and relates to a technology of collecting data about a putting field of each store from at least one store terminal and performing a simulation of putting performed at a plurality of positions within the putting field installed in each store, selecting trajectory data of a ball entering a hole cup among trajectory data for a plurality of balls derived from a simulation result and selecting an optimal putting trajectory, and then projecting the optimal putting trajectory onto the putting field through a projector.

17 Claims, 10 Drawing Sheets

(56) References Cited

U.S. PATENT DOCUMENTS

| | | | |
|---|---|---|---|
| 10,220,286 B2* | 3/2019 | Thurman | A63B 37/0056 |
| 10,265,602 B2* | 4/2019 | Haas | A63B 69/36 |
| 10,315,093 B2* | 6/2019 | Tuxen | A63B 69/36 |
| 10,898,757 B1* | 1/2021 | Johansson | G01S 13/867 |
| 11,606,617 B2* | 3/2023 | Armstrong | H04N 21/47217 |
| 11,724,173 B2* | 8/2023 | Rankin | A63B 24/0021 |
| 11,758,238 B2* | 9/2023 | Davies | H04N 21/854 |
| | | | 725/32 |
| 11,844,981 B2* | 12/2023 | Korpach | A63F 13/537 |
| 12,017,132 B2* | 6/2024 | Lee | G06T 19/00 |
| 12,330,020 B2* | 6/2025 | Johansson | G01S 13/867 |
| 2011/0053688 A1* | 3/2011 | Crawford | A63D 5/04 |
| | | | 463/31 |
| 2011/0070961 A1* | 3/2011 | Nicora | A63B 71/022 |
| | | | 473/409 |
| 2011/0080467 A1* | 4/2011 | Daly | A63B 71/06 |
| | | | 348/E13.001 |
| 2011/0237357 A1* | 9/2011 | Aquino | A63B 63/00 |
| | | | 473/409 |
| 2011/0267461 A1* | 11/2011 | Birenboim | G06T 7/215 |
| | | | 348/142 |
| 2011/0273562 A1* | 11/2011 | Dawe | A63B 69/3658 |
| | | | 348/139 |
| 2012/0306892 A1* | 12/2012 | Hui | G09B 19/0038 |
| | | | 345/474 |
| 2013/0085018 A1* | 4/2013 | Jensen | A63F 13/812 |
| | | | 473/404 |
| 2014/0092253 A1* | 4/2014 | Marty | A63B 69/0071 |
| | | | 473/448 |
| 2014/0162798 A1* | 6/2014 | Kim | A63B 69/3629 |
| | | | 473/132 |
| 2015/0005085 A1* | 1/2015 | Tatum | A63B 67/02 |
| | | | 473/166 |
| 2016/0144251 A1* | 5/2016 | Denning | G09B 19/0038 |
| | | | 473/409 |
| 2016/0158640 A1* | 6/2016 | Gupta | A63F 13/812 |
| | | | 463/3 |
| 2017/0161561 A1* | 6/2017 | Marty | H04N 23/90 |
| 2018/0165711 A1* | 6/2018 | Montemayor | G06Q 30/0255 |
| 2020/0013312 A1* | 1/2020 | Pregizer | A63B 24/0021 |
| 2021/0220718 A1* | 7/2021 | Tuxen | A63B 24/0021 |
| 2022/0118341 A1* | 4/2022 | Tanaka | G06V 10/14 |
| 2022/0270509 A1* | 8/2022 | Josephson | G09B 5/065 |
| 2023/0364484 A1* | 11/2023 | Rossi | A63B 57/357 |
| 2024/0185205 A1* | 6/2024 | Gutke | G06Q 20/208 |
| 2024/0334016 A1* | 10/2024 | Ziegler | H04N 21/6373 |
| 2025/0083018 A1* | 3/2025 | Clearwater | A63B 69/3676 |
| 2025/0166363 A1* | 5/2025 | Griset | G06V 20/52 |
| 2025/0205570 A1* | 6/2025 | Mather | A63B 60/42 |

FOREIGN PATENT DOCUMENTS

| | | |
|---|---|---|
| KR | 10-2022-0168193 A | 12/2022 |
| KR | 10-2023-0076160 A | 5/2023 |

* cited by examiner

METHOD FOR PROVIDING OPTIMAL PUTTING PATH

CROSS-REFERENCE TO RELATED APPLICATION

This application is based on and claims priority under 35 U.S.C. § 119 to Korean Patent Application No. 10-2023-0140244, filed on Oct. 19, 2023, in the Korean Intellectual Property Office, the disclosure of which is incorporated by reference herein in its entirety.

BACKGROUND

1. Field

The present disclosure relates to a method for providing an optimal putting path and a system thereof, more specifically, the present disclosure relates to a technology that provides a training function of providing the most ideal putting path for a ball of putting to reach a hole cup and of putting the ball in such an ideal putting path by means of analysis of a user's putting made on a putting field.

2. Description of the Related Art

Recently, as a golf game playing in a screen golf range, an indoor golf practice range, or the like has become popular among the public, related entertainment service businesses are increasing.

Here, with regard to putting, which is part of the golf game, the indoor golf practice range, rather than the existing outdoor practice range, is becoming popular. In the indoor golf practice range, portable terminals (tablet PC, multi-function monitor, small installed kiosk, and the like) installed in workplaces are being actively used to provide training content related to putting and swing of the golf.

However, since these portable terminals have to be installed by considering the store's design and space utilization aspects, these portable terminals are miniaturized and simplified, and thereby the problem is that its storage space and functions are very limited.

SUMMARY

The present disclosure is intended to solve the problems of the prior art described above, and the present disclosure aims to provide an optimal putting path providing system that minimizes functions of portable terminals (hereinafter referred to as store terminals) used in stores and includes a plurality of servers connected wired and wirelessly through a communication network.

In addition, through this, the present disclosure aims to increase space utilization in stores and provide a system with excellent design by enabling store terminals to be relatively small and simplified to provide a sufficient level of service even if they only include simple functions.

Problems to be solved by the present disclosure are not limited to the problems mentioned above, and other problems not mentioned may be clearly understood from the description below.

As technical means for solving the above-described technical problem, a method for providing an optimal putting path performed by a system according to an embodiment of the present disclosure includes (a) collecting data about a putting field of each store from at least one store terminal and performing a simulation of putting performed at a plurality of positions within the putting field installed in each store by a main server; (b) selecting trajectory data of a ball entering a hole cup among trajectory data for a plurality of balls derived from a simulation result of the main server and selecting an optimal putting trajectory from the selected trajectory data; (c) transmitting the optimal putting trajectory to at least one local server by the main server and storing the received optimal putting trajectory by the local server; and (d) transmitting an image of the position of the ball on the putting field is to the local server when the ball is located at a preset position on the putting field, receiving the optimal putting trajectory from the local server, and projecting the optimal putting trajectory onto the putting field through a projector.

In addition, in (a), the simulation is performed in a way of calculating a plurality of trajectory data by calculating the trajectory of the ball by considering a friction force and a slope of the putting field when the ball is hit in all possible hitting directions to be executed without specifying a direction of a putter at a plurality of preset putting start positions.

In addition, in (a), when the ball is hit in one direction, the trajectory of the ball may be calculated by hitting the ball with all the hitting forces capable of being to be performed at a specific hitting force interval from the minimum value to the maximum value of a preset hitting force.

In addition, in (a), the simulation may be performed by considering putting field parameters including a height, a slope, and a friction force for each section of a terrain that constitutes the putting field pre-stored in the main server.

In addition, in (b), trajectory data located in the middle in the order may be selected as the optimal putting trajectory among a plurality of trajectory data corresponding to data between a result value with the minimum value and a result value with the maximum value of the slope of the putting field in a direction from the ball position to the hole cup, among result values of the performed simulation data by considering a time taken for the hit ball to reach the hole cup, a distance for the hit ball to reach the hole cup, and a curvature of the trajectory of the hit ball until the hit ball reaches the hole cup among the plurality of trajectory data.

In addition, each optimal putting trajectory may be matched with a putting start position of the ball and stored.

In addition, (d) may include (d–1) photographing the putting field with a camera device and transmitting an image including the positions of the ball and the hole cup to the local server by the store terminal; (d–2) recognizing the positions of the ball and the hole cup in the received image received by the local serve; and (d–3) searching for the optimal putting trajectory corresponding to the positions of the ball and the hole cup recognized by the local server, and projecting the searched optimal putting trajectory by the projector.

In addition, in (d–3), the optimal putting trajectory may be projected and displayed in a solid line extending from the position of the ball to the position of the hole cup recognized by the local server, and an entire trajectory of the optimal putting trajectory may be provided at once before the actual putting is made.

In addition, in (d–3), the optimal putting trajectory may be projected and displayed in a solid line extending from the position of the ball to the position of the hole cup recognized by the local server, and an entire trajectory of the optimal putting trajectory may be provided at once before the actual putting is made.

In addition, the method for providing an optimal putting path may further include (d–0) providing a training condition UI for setting training conditions by the local server, receiving the training conditions from the user terminal, and projecting the position of the ball to be hit onto the putting field before (d); and (d+0) collecting the trajectory and hitting results of the ball hit by the user by the local server and visualizing the statistics thereof to be provided after (d).

In addition, in p (d), when receiving a pattern test request from the user terminal, pattern test training may be provided through a pattern test UI, the pattern test UI may include a training condition UI which is provided in (d–0) and receives setting for a plurality of putting distances to be trained, a training order of the putting distances, a progress direction of a section to be trained for a preset section of the putting field, and a time limit during training from the user terminal; a training progress UI which is provided in (d) and with which training is conducted according to the training conditions received through the training condition UI, and which provides a training progress of the training through dividing of the training progress into before progress, in progress, putting success, and putting failure, and displaying those in different colors on preset sections of the putting field; and a training result UI that is provided in (d+1), provides training classification number, training date and time, number of putts attempted in the training, number of successful putts, number of failed putts, putting success rate, average return distance of the hit ball, and total return distances, in a table, after the training ends, provides the success rate for each breaking line depending on a preset breaking line and a pitch quality of the hit ball, in a polygonal graph, displays the training conditions for the training, and provides an average start tendency and a speed tendency over time of the balls hit during the training, in a bar-type graph, and the putting field may have a plurality of preset slopes and includes breaking lines distinguished by 'Down' when the slope is downward, 'Up' when the slope is upward, and 'Flat' when the slope is flat.

In addition, when the putting field is circular, the training progress UI may divide the putting field into 12 sections with the same area and divide the 12 sections each into 3 sections such that the putting field may be formed to include a total of 36 sections.

In addition, when receiving a selection input for the bar-type graph according to the average start tendency of balls hit during the training from the user terminal, the training result UI may provide the breaking line corresponding to the training performed in each section, the ball's direction of movement, and the ball's hitting position according to the trained putting distance in each section for hits performed in at least one of the 36 sections on the putting field, in a bar-type graph, and the hitting position of the ball may be displayed as a scale within the bar in which a side with a low slope of the terrain is designated as 'Low', and a side with a high slope is designated as 'High' based on a straight line between the ball where the putting is performed and the target hole cup.

In addition, when receiving a selection input for the bar-type graph according to the average speed tendency of balls hit during the training from the user terminal, the training result UI may provide the direction and the speed of the ball hit for each putting distance corresponding to the training performed in each section for hits performed in at least one of 36 sections on the putting field, and the breaking line formed by combining at least two of the 36 sections on the putting field and the pitch quality of the hit ball may be classified into at least one of 'Straight', 'Hook', and 'Slice', and displayed together.

In addition, in (d–1), settings for the plurality of putting distances to be trained, the training order of the putting distances, the progress direction of the section to be trained for a preset section of the putting field, and the time limit during training may be received from the user terminal through the training condition UI, in (d), as training progresses according to the received training conditions, the training progress for the training through the training progress UI may be displayed on the user terminal by dividing the training progress into before progress, in progress, putting success, and putting failure to be displayed in different colors on preset sections of the putting field, and in (d+0), after the training ends, for the training, all statistical information about training classification number, training date and time, number of putts attempted in the training, number of successful putts, number of failed putts, putting success rate, average return distance of the hit ball, total return distances, success rate for each breaking line depending on a preset breaking line and the pitch quality of the hit ball, training conditions for the training, and the average start tendency and speed tendency over time of balls hit during the training may be displayed on the user terminal.

In addition, the training result UI may further include a stroke result UI that provides the success or failure of the putting attempted in the training through displaying the success or failure in different color according to the section of the putting field after the training is completed, and may provide a stroke time of the attempted putting in each section through displaying the stroke time in number, and the stroke time may be a time until just before the ball is hit from when the ball is recognized from the server during training and a preset training start signal is generated.

An optimal putting path providing system according to an embodiment of the present disclosure includes a putting field that is installed in a plurality of stores and where putting for a ball is performed; a store terminal that is installed in a plurality of stores, collects data about the putting field with a camera device, and provides the collected data to a main server; a main server that receives data about the putting field from the store terminal, performs a simulation of the putting performed at a plurality of positions within the putting field installed in each store, selects trajectory data of the ball entering the hole cup among trajectory data for a plurality of balls derived from simulation results, selects an optimal putting trajectory from the selected trajectory data, transmits the optimal putting trajectory to a local server, transmits an image of the position of the ball on the putting field when the ball is located at a preset position on the putting field, receives the optimal putting trajectory from the local server, and controls at least one of projects to project the optimal putting trajectory onto the putting field; at least one local server that stores the optimal putting trajectory received from the main server; and a projector that projects at least one putting trajectory onto the putting field under the control of the main server.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Below, with reference to the attached drawings, embodiments of the present disclosure will be described in detail such that those skilled in the art may easily implement the present disclosure. However, the present disclosure may be implemented in many different forms and is not limited to the embodiments described herein. In order to clearly explain the present disclosure in the drawings, parts that are not related to the description are omitted, and similar parts are given similar reference numerals throughout the specification.

Throughout the specification, when a part is said to be "connected" to another part, this includes not only the case where it is "directly connected," but also the case where it is "electrically connected" with another element therebetween. Additionally, when a part "includes" a certain component, this means that it may further include other components rather than excluding other components, unless specifically stated to the contrary.

In this specification, 'portion' includes a unit realized by hardware, a unit realized by software, and a unit realized using both. Additionally, one unit may be realized using two or more pieces of hardware, and two or more units may be realized using one piece of hardware. Meanwhile, '~ portion' is not limited to software or hardware, and '~ portion' may be configured to reside in an addressable storage medium or may be configured to reproduce one or more processors. Therefore, as an example, '~ portion' includes components such as software components, object-oriented software components, class components, and task components, processes, functions, properties, procedures, subroutines, segments of program code, drivers, firmware, microcode, circuits, data, databases, data structures, tables, arrays, and variables. The functions provided within the components and 'portions' may be combined into a smaller number of components and 'portions' or may be further separated into additional components and 'portions'. Additionally, components and 'portions' may be implemented to regenerate one or more CPUs within a device or a secure multimedia card.

The "terminal" mentioned below may be implemented as a computer or portable terminal that may connect to a server or other terminal through a network. Here, the computer includes, for example, a laptop equipped with a web browser, a desktop, a laptop, a VR HMD (e.g., HTC VIVE, Oculus Rift, GearVR, DayDream, PSVR, etc.), etc. Here, VR HMD includes all for PC (e.g., HTC VIVE, Oculus Rift, FOVE, Deepon, etc.), mobile (e.g., GearVR, DayDream, Storm Magic, Google Cardboard, etc.), console (PSVR), and independently implemented Stand Alone models (e.g., Deepon, PICO, etc.). Portable terminals is, for example, wireless communication devices that ensure portability and mobility, and may include smart phones, tablet PCs, and wearable devices, as well as various devices equipped with communication modules such as Bluetooth (BLE, Bluetooth Low Energy), NFC, RFID, ultrasonic, infrared, WiFi, and LiFi. In addition, "network" refers to a connection structure that allows information exchange between nodes such as terminals and servers, and includes a local area network (LAN), a wide area network (WAN), and the Internet (WWW: World Wide Web), wired and wireless data communication network, telephone network, wired and wireless television communication network, etc. Examples of wireless data communication networks include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasound communication, Visible Light Communication (VLC), LiFi, etc., but is not limited thereto.

The present disclosure relates to a method and a system for providing an optimal putting path, and relates to a technology that analyzes a user's putting made on a putting field, provides the most ideal path for the ball of the putting to reach the hole cup, and provides a training function of putting on this ideal path.

Figure 1:
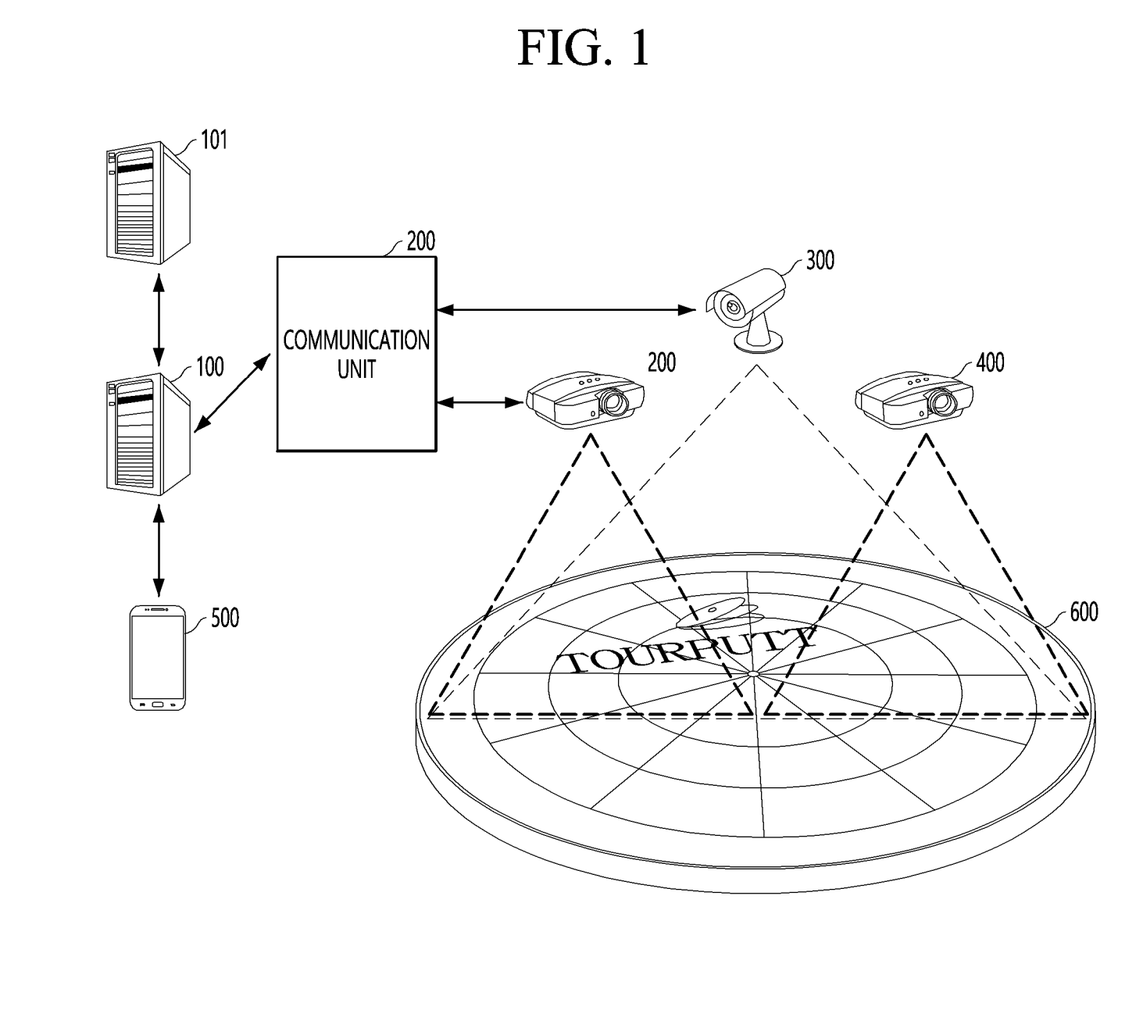
FIG. 1 is a structural diagram of an optimal putting path providing system according to an embodiment of the present disclosure.

With reference to FIG. 1, for this purpose, the putting optimal path providing system according to an embodiment of the present disclosure may be configured to include a main server 100, a local server 101, a store terminal 200, at least one camera device 300, a plurality of projectors 400, a user terminal 500, and a putting field 600.

Figure 2:
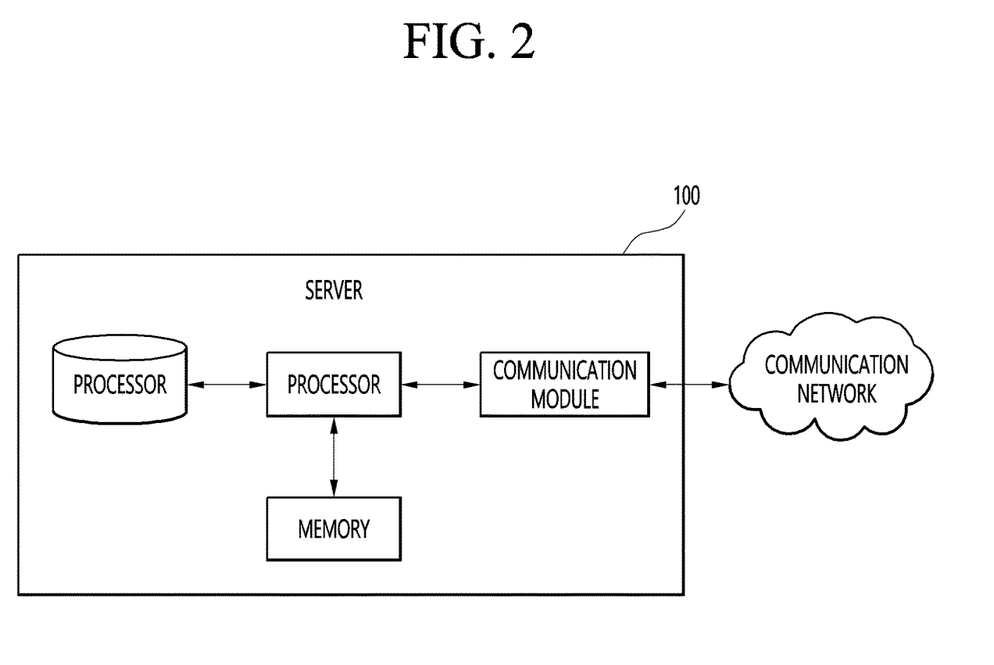
FIG. 2 is a block diagram illustrating an internal configuration of a main server and a local server according to an embodiment of the present disclosure.

The main server 100 and the local server 101 according to an embodiment of the present disclosure may be configured to include a memory storing a program (or application) for performing a method for providing an optimal putting path, a processor executing the above program, and a database (DB). Here, the processor may perform various functions depending on the execution of the program stored in the memory, and the functions performed by the main server 100 and the local server 101 will be described in detail later.

The store terminal 200 may be implemented in various forms according to various embodiments, but in a preferred embodiment, it includes a touch panel or a controller that may be operated by a user, and a program or an application, which may be connected and communicated wired and wirelessly to the main server 100, the local server 101, the camera device 300, and the user terminal 500, and may display a predetermined UI (User Interface) received from the main server 100 or the local server 101 on a screen, may be installed.

The store terminals 200 may be implemented in either a form in which the store terminals 200 are fixed and installed together in a space where the system of the present disclosure is installed or a form in which the store terminals 200 are connected via wireless communication and carried by the user, and a representative example may be in a form of a tablet PC.

The store terminals 200 implemented as described above are installed in a plurality of stores and collect data about the putting field with the camera device 300, and serve to provide the collected data to the main server, and according to another embodiment of the present disclosure, the previously described programs and applications may be installed on the user terminal 500 to perform the role of the store terminal 200.

In this case, the camera device 300 may also be replaced with a built-in camera module of the user terminal 500, and the user may directly take pictures with the built-in camera module after executing the corresponding program or application.

Next, the projector 400 may project at least one putting trajectory onto the putting field under the control of the main server 100, and may be installed in a predetermined space above a place where the system of the present disclosure is installed (hereinafter referred to as putting room), for example, a plurality of the projectors 400 may be installed on the ceiling, etc. to project the putting trajectory.

According to a further embodiment of the present disclosure, the plurality of projectors 400 are set to project different images (e.g., different UIs) when at least two projectors are installed, such that the plurality of projectors project simultaneously. As a result, overlapping projection images may be projected to include multiple pieces of information or interfaces.

In addition, the putting field 600 according to an embodiment of the present disclosure is installed in a plurality of stores, refers to a predetermined space where putting for a ball is performed, and is installed on a floor of the putting room. A surface on which putting is performed may be formed of artificial turf or natural turf.

Here, the putting field 600 has a plurality of preset slopes, and may include breaking lines distinguished by 'Down' when the slope is downward in a direction in which the ball travels based on the ball, 'Up' when the slope is upward, and 'Flat' when the slope is flat when putting is performed. The breaking lines will be described along with an explanation of the operations of the main server 100 and the local server 101, which will be described later.

Hereinafter, the execution of the method for providing an optimal putting path performed by the main server 100 will be described based on the optimal putting path providing system described above.

According to an embodiment of the present disclosure, the main server 100 collects data about the putting field of each store from at least one store terminal according to the execution of the processor, and performs a simulation of the putting performed at a plurality of positions within the putting field installed in each store.

Here, the simulation described above may be performed in a way of calculating a plurality of trajectory data by calculating the trajectory of the ball by considering a friction force and the slope of the putting field when the ball is hit in all possible hitting directions to be executed without specifying a direction of the putter (head portion of the golf club) at a plurality of preset putting start positions.

At this time, when the user hits the ball in one direction, the simulation calculates the entire trajectory of the hit ball in a case where the user hits the ball with all the hitting forces that may be performed at a specific hitting force interval from the minimum value to the maximum value of a preset hitting force. It may be simulated by considering putting field parameters including a height, a breaking line, a slope, and a friction force for each section of a terrain that constitutes the putting field pre-stored in the main server.

Figure 3:
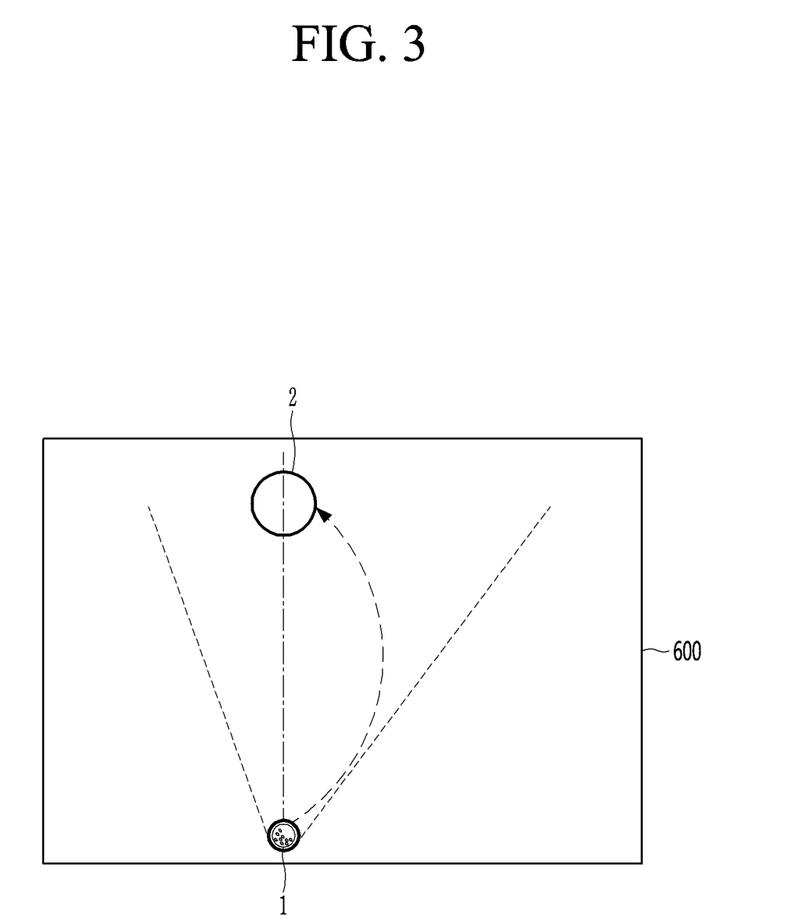
FIG. 3 is an illustration view of a method for providing an optimal putting path according to an embodiment of the present disclosure.

For example, as illustrated in FIG. 3, simulations may be performed for various hits having result values, with which the ball reaches the hole cup, and through this, the main server 100 of the present disclosure may obtain a hitting trajectory that reflects various indicators such as terrain section, height, and friction force, rather than necessarily a linear hitting trajectory between the ball and the hole cup.

Next, the main server 100 selects the trajectory data of the ball entering the hole cup among the trajectory data for the plurality of balls derived from the simulation results, and selects the optimal putting trajectory from the selected trajectory data.

In general, in situations where realistic physical laws exist, there are countless cases in which the ball may simply enter the hole cup. Among these cases, in order to select the optimal putting trajectory, the main server 100 considers the time taken for the hit ball to reach the hole cup, the distance for the hit ball to reach the hole cup, and the curvature of the trajectory of the hit ball until it reaches the hole cup among the plurality of trajectory data to select a hitting trajectory, in which at least one of the reaching time, the reaching distance, and the curvature thereof is the minimum value, as the optimal putting trajectory.

According to another embodiment of the present disclosure, when selecting the optimal putting trajectory, the main server 100 may also select trajectory data located in the middle in the order (for example, trajectory data corresponding to the 15th number of cases among a plurality of trajectory data corresponding to the number of 30 cases) as the optimal putting trajectory among the plurality of trajectory data corresponding to data between the result value with the minimum value and the result value with the maximum value of the slope of the putting field in the direction from the ball position to the hole cup, among the result values of the performed simulation data.

The optimal putting trajectory selected in this way is matched with the putting start position of the ball, the main server transmits the optimal putting trajectory to at least one local server, the optimal putting trajectory received by the local server is stored, and the optimal putting trajectory may be used in a trajectory provision process which will be described later.

Once the above-described simulation process is completed, the main server 100 may provide the optimal path for the user to perform putting for all putting performed on the corresponding putting field.

This path provision process may be executed in which when the ball is located at a preset position on the putting field, the main server 100 recognizes the position, transmits an image of the position of the ball on the putting field to the local server, and receives the optimal putting trajectory from the local server to project the optimal putting trajectory through a projector.

To this end, the store terminal photographs the putting field with a camera device and transmits an image including the positions of the ball and the hole cup to the local server.

The local server 101 recognizes the positions of the ball and the hole cup in the received image, searches for the optimal putting trajectory corresponding to the positions of the ball and the hole cup recognized by the local server, and transmits the searched optimal putting trajectory to the main server 100, and thereby by the projector projects the optimal putting trajectory onto the putting field under the control of the main server 100.

At this time, the recognition of the hole cup and ball performed by the local server 101 may be performed in various methods, such as a vision recognition method, an image comparison method, and a machine learning model-based learning result value method. The optimal putting trajectory of the ball and the hole cup recognized by the methods described above may be implemented by projecting and displaying a solid line extending from the position of the ball to the position of the hole cup recognized by the local server. In this case, the entire trajectory of the optimal putting trajectory may be provided at once before the actual putting is made.

For example, in a state where the simulation by the main server 100 is completed, when the user puts the ball down at a specific position to perform putting, the optimal putting trajectory retrieved from the local server is projected and displayed on the putting field before the user performs putting. Therefore, the user may be presented with guidelines for future putting to execute.

In addition, after the actual putting is made by the user, the optimal putting trajectory may be sequentially generated and provided along with the actual trajectory drawn by the ball as it moves.

That is, when the user performs putting to move the ball along the same trajectory as the projected trajectory on the putting field, the actual putting trajectory may be projected and displayed behind the moving ball while the hit ball progresses to the hole cup.

Here, before the user performs putting, the local server 101 may also provide a training condition UI for setting training conditions to the user terminal 500, receive the training conditions from the user terminal, and project the position of the ball to be hit onto the putting field in accordance with the received training conditions.

Here, in a case where the local server 101 according to an embodiment of the present disclosure receives a pattern test request from the user terminal, pattern test training provided in different UIs may be provided depending on the training progress of before, during, and after the user's putting execution through the pattern test UI, and the pattern test UI may include the training conditions UI, the training progress UI, and the training result UI to provide such training.

Figure 4:
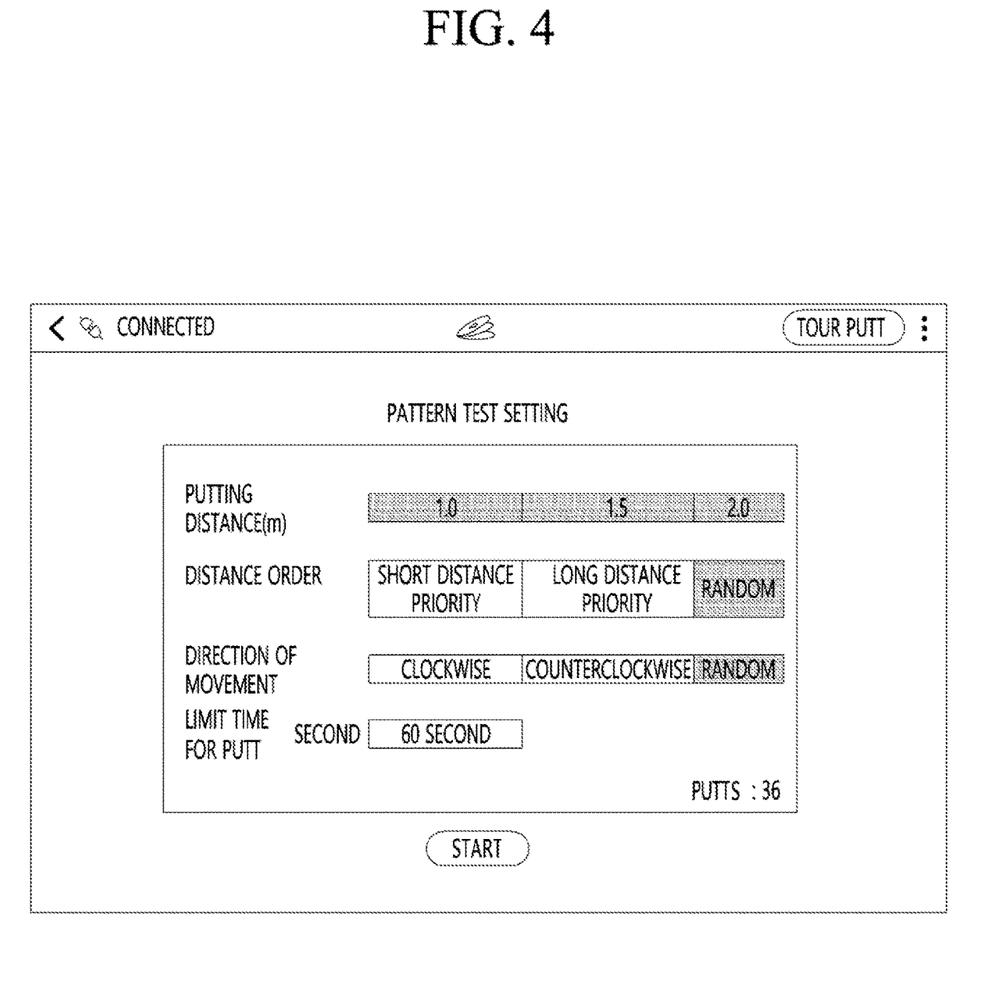
FIG. 4 is an illustration view of a training condition UI according to an embodiment of the present disclosure.

First, with reference to FIG. 4, the training condition UI, as illustrated in the drawing, includes a plurality of UIs that may be set for a plurality of putting distances to be trained, a training order of the putting distances, a progress direction of the section to be trained for a preset section of the putting field, and the time limit during training from the user terminal. Settings for the plurality of putting distances to be trained, the training order of the putting distances, the progress direction of the section to be trained for a preset section of the putting field, and the time limit during training may be received from the user terminal through the training condition UI.

Through this, the user may proceed with training by selecting training conditions suitable for the user according to his or her putting proficiency or progress according to the training period.

Figure 5:
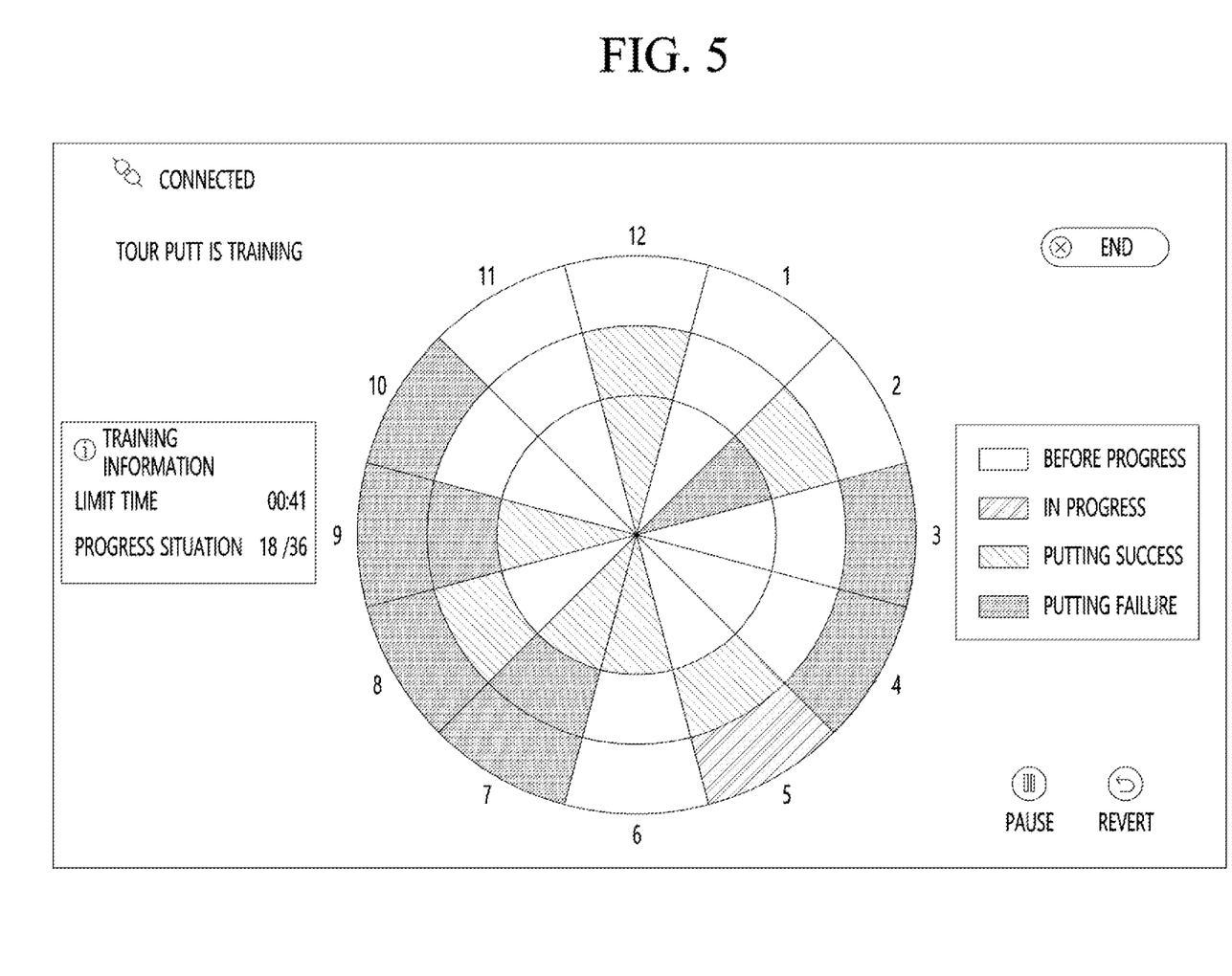
FIG. 5 is an illustration view of a training progress UI according to an embodiment of the present disclosure.

Next, with reference to FIG. 5, while pattern test training is in progress, training is conducted according to the training conditions received through the training condition UI. For a plurality of putting performed in the training, the training progress UI is provided by dividing the training progress into before progress, in progress, putting success, and putting failure, and displaying them in different colors on preset sections of the putting field.

At this time, when the putting field is circular as illustrated in the drawing, the training progress UI divides the putting field into 12 sections with the same area, and divides the 12 sections each into 3 sections such that it may be formed to include a total of 36 sections.

In the 36 divided sections, at least one putting may be performed for each section, and the results and progress of putting performed in each section may be displayed in distinct colors by being divided into a state where putting is currently in progress (state where the user and the ball are located at the designated training positions, but putting has not yet been performed), a state where putting has been performed but the hit ball has not entered the hole cup, and a state where putting has been performed and the hit ball has entered the hole cup.

Among these, in a state where putting is currently in progress, in the training progress UI, along with the GUI (Graphic User Interface) of the putting field, there is a GUI, which illustrates the time limit for the putting being currently performed and which putt the current putting is among a total of 36 putts, may be displayed together.

When at least one putting is performed for each section and a total of 36 putts may be performed, the local server 101 determine that the training is completed, collect the trajectory and hitting results of the ball hit by the user, and visualizes the statistics thereof to be provided.

Figure 6:
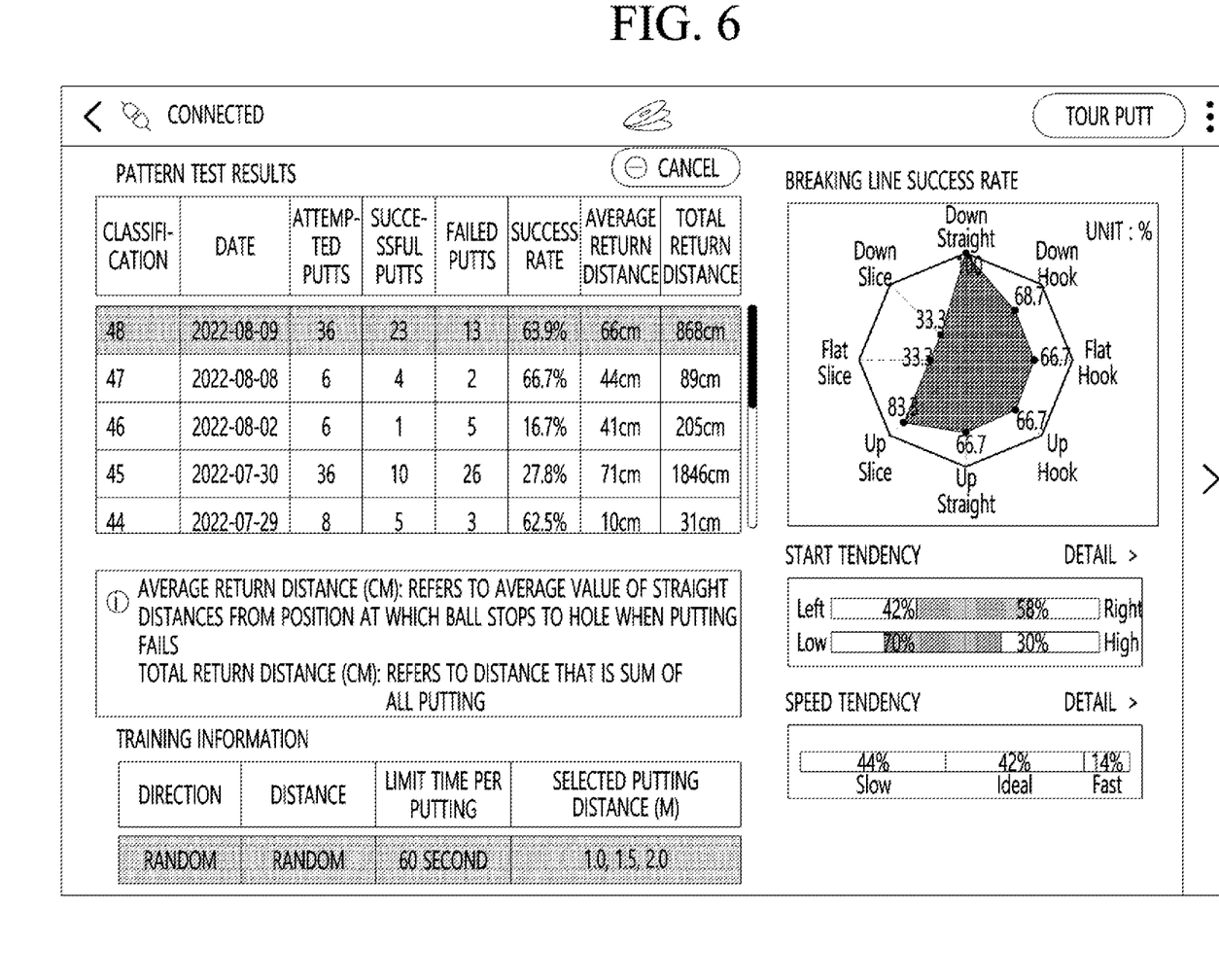
FIG. 6 is an illustration view of a training result UI according to an embodiment of the present disclosure.

The visualized statistics provided here may be provided through the training result UI. As illustrated in FIG. 6, after the training ends, the training result UI according to an embodiment of the present disclosure may provide training classification number, training date and time, number of putts attempted in the training, number of successful putts, number of failed putts, putting success rate, average return distance of the hit ball, and total return distances, in a table, provide the success rate for each breaking line depending on a preset breaking line and the pitch quality of the hit ball, in a polygonal graph, display the training conditions for the training, and provide the average start tendency and speed tendency over time of balls hit during the training, in a bar-type graph.

Each of indicators for the training provided as described above may be provided on one screen or on each independent screen through an independent sheet or GUI, and detailed information may be provided when receiving a selection input from the user terminal.

Figure 7:
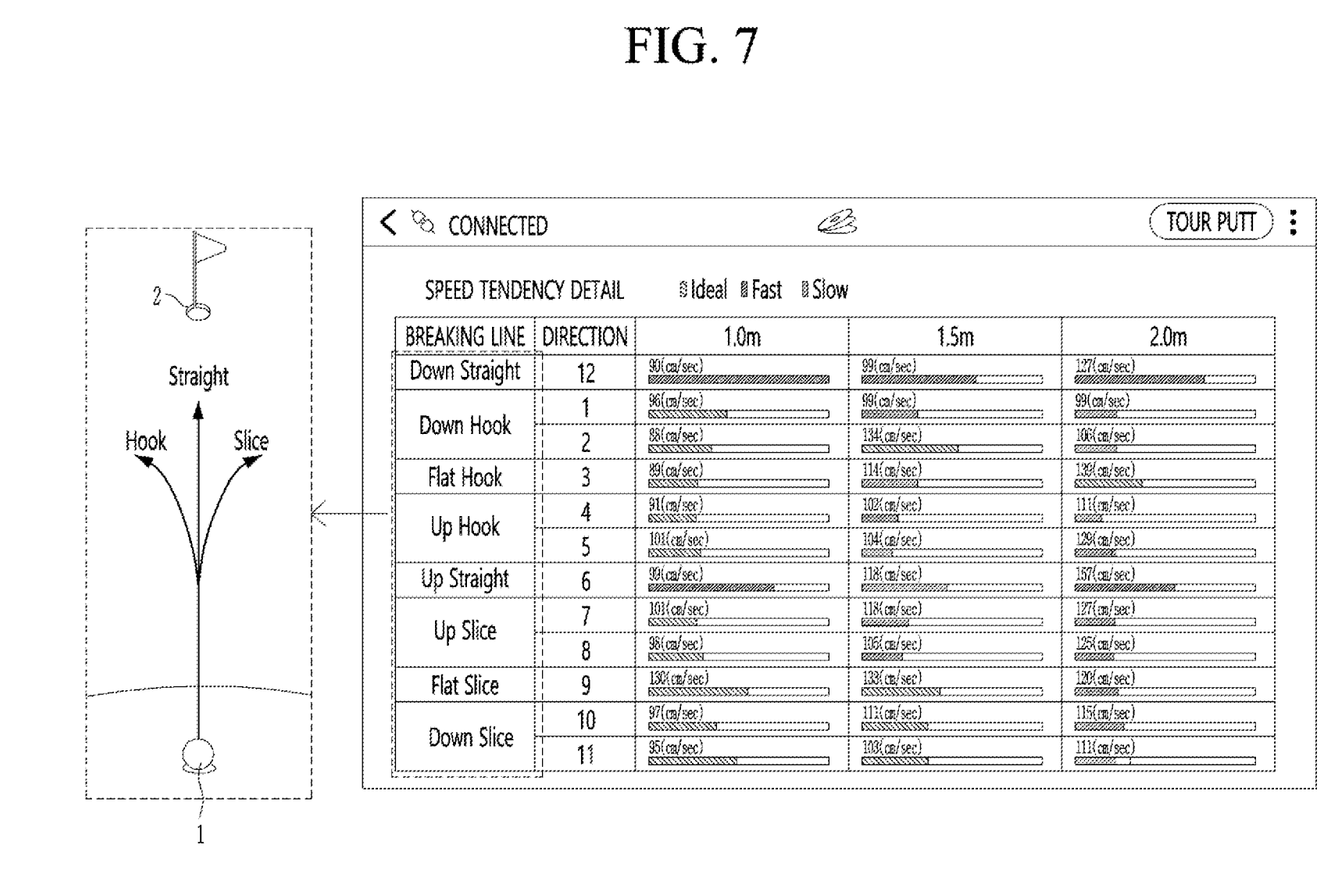
FIG. 7 is an illustration view of a bar-type graph according to start tendency according to an embodiment of the present disclosure.

For example, when receiving a selection input for a bar-type graph according to the average speed tendency of balls hit during the training from the user terminal, for hits performed in at least one of 36 sections on the putting field, the direction and speed of the ball hit for each putting distance corresponding to the training performed in each section may be provided in a table.

At this time, the pitch quality of the ball hit in each putting may be provided separately by breaking line. The pitch quality of the hit ball is divided into 'Straight' in a case where the ball goes straight without bending as illustrated, 'Hook' in a case where the ball bends to the inside of the user's body, that is, inward, and 'Slice' in a case where the ball bends to the outside of the user's body, that is, outward.

In addition, the breaking line of the putting field corresponding to the path of the hit ball may be provided by being divided into 'Down' in a case where the slope is downhill, 'Up' in a case where the slope is uphill, and 'Flat' in a case where the slope is flat.

Therefore, the user may determine how the pitch quality of the ball he or she has hit is affected by the terrain. Through this, if a different pitch quality occurs on the same terrain, the user may quickly identify the problem of the hit, thereby making it useful for putting training.

Figure 8:
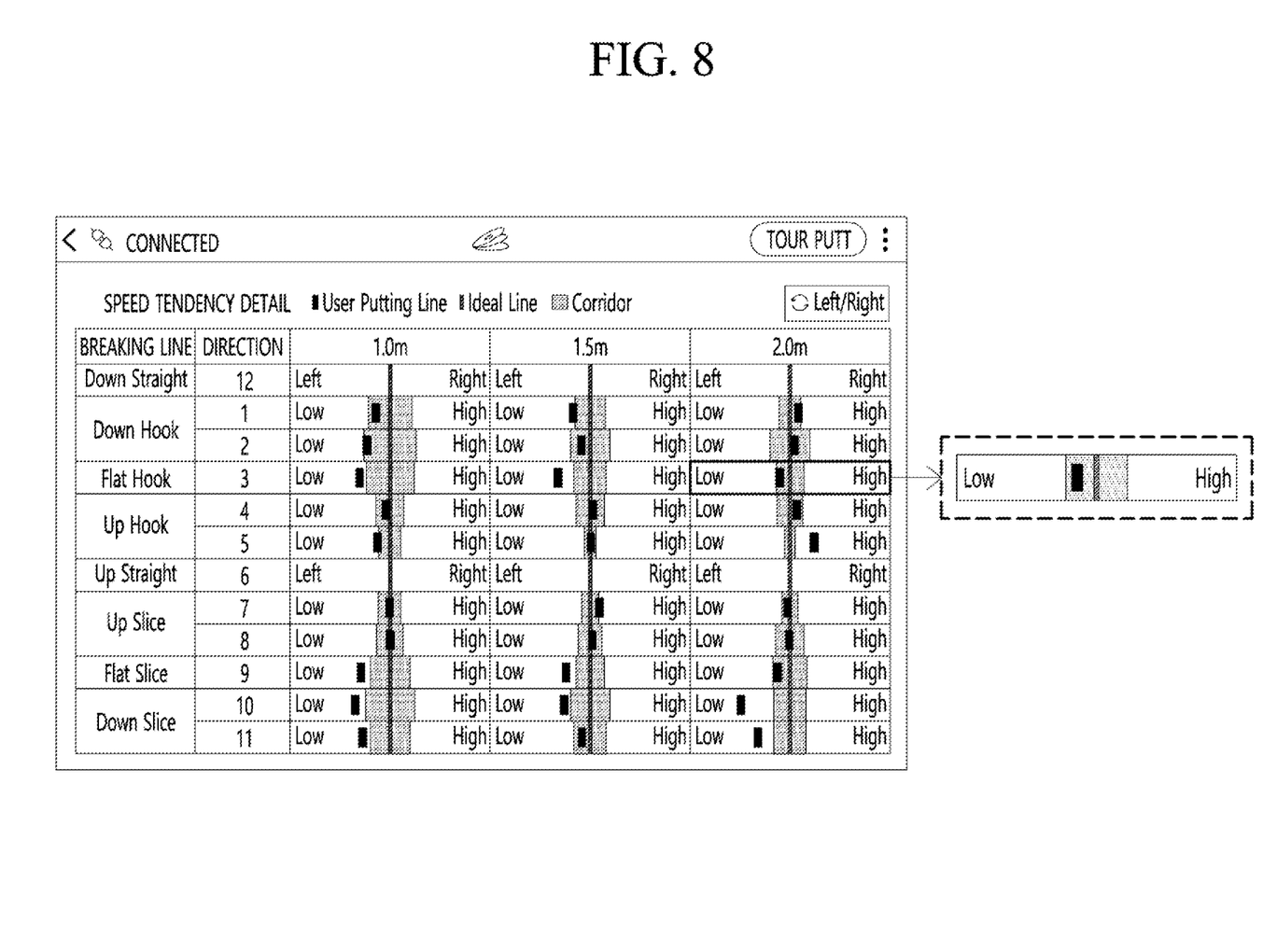
FIG. 8 is an illustration view of a bar-type graph according to a speed tendency according to an embodiment of the present disclosure.

Similarly, in a case where a selection input for the bar-type graph according to the average start tendency of balls hit during the training is received from the user terminal, for hits performed in at least one of the 36 sections on the putting field, the breaking line corresponding to the training performed in each section, the ball's direction of movement, and the ball's hitting position according to the trained putting distance may be provided in a bar-type graph.

As illustrated in FIG. 8, the graph according to the start tendency, like the graph according to the speed tendency, also displays the pitch quality and breaking line of the hit ball together, and in a case of the hitting position of the ball, the start direction of the ball where the putting is performed may be displayed as a scale within the bar in which a side with a low slope of the terrain is designated as 'Low', and a side with a high slope is designated as 'High' based on a straight line between the ball and the target hole cup.

Meanwhile, according to another embodiment of the present disclosure, in addition to Low and High for the hitting position of the ball, the UI may display the left direction of the user performing the putting as 'Left' and the right direction as 'Right', as a scale in the bar.

Through this, when performing the hit, the user may check whether the ball went left, right, or on the high or low side of the ground slope which are compared therebetween based on a line perpendicular to the start direction corresponding to the ideal putting trajectory of the angle of the face surface of the club when the hitting is performed. Therefore, the check may be useful for performing putting training by considering the pitch quality and the breaking line of the ball that occur accordingly.

Figure 9:
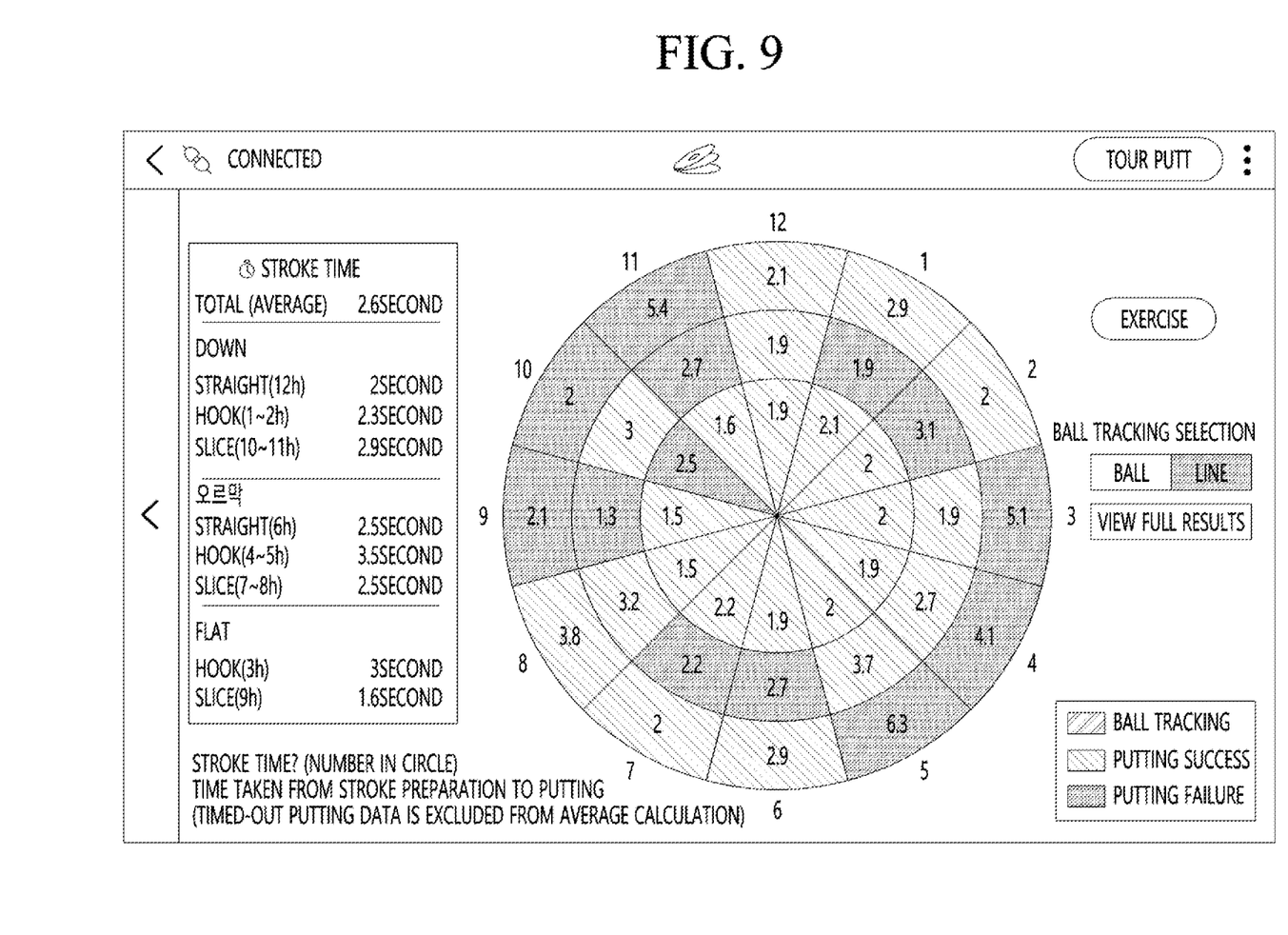
FIG. 9 is an illustration view of a stroke result UI according to an embodiment of the present disclosure.

In addition, with reference to FIG. 9, the training result UI may further include a stroke result UI that provides the success or failure of the putting attempted in the training through displaying it in different color according to the section of the putting field after the training is completed, and provides a stroke time of the attempted putting in each section through displaying it in number.

At this time, the stroke time meant in the present disclosure is the time until just before the ball is hit from when the ball is recognized from the main server or local server during training and a preset training start signal is generated, and refers to an indicator that may be checked to see how consistent the putting routine is by checking the time taken for the user to perform putting.

The stroke result UI may be implemented in different forms according to various embodiments, but in the preferred embodiment, a putting field GUI is included that displays the success or failure of the attempted putting in different colors according to the section of the putting field. The stroke time may be displayed together on the putting field GUI, and the stroke time for all putting performed during training may be displayed together by being divided by breaking line and the pitch quality.

Figure 10:
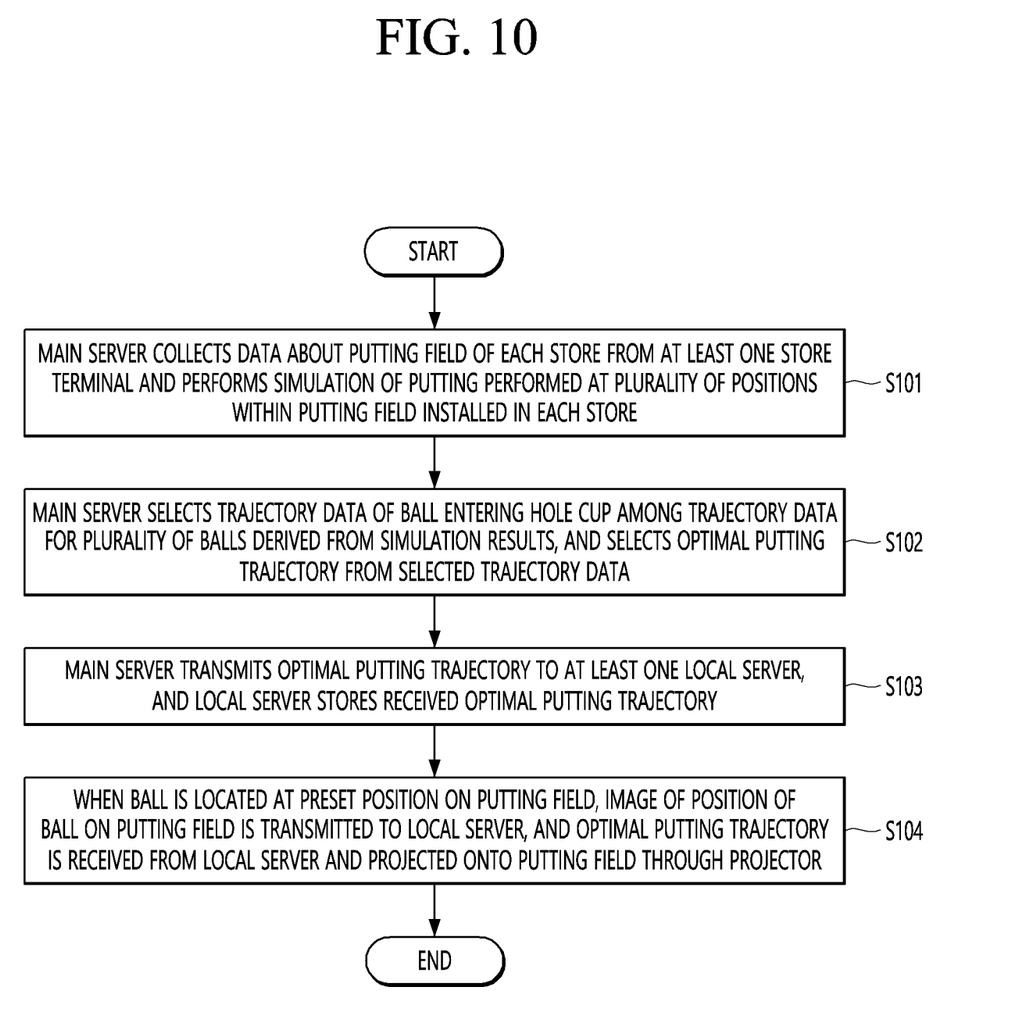
FIG. 10 is a flowchart of an execution order of a method for providing an optimal putting path according to an embodiment of the present disclosure.

Below, with reference to FIG. 10, the execution order of the method for providing an optimal putting path according to an embodiment of the present disclosure will be described.

First, the main server collects data about the putting field of each store from at least one store terminal and performs a simulation of putting performed at a plurality of positions within the putting field installed in each store (S101).

The main server selects the trajectory data of the ball entering the hole cup among the trajectory data for a plurality of balls derived from the simulation results, and selects the optimal putting trajectory from the selected trajectory data (S102).

Next, the main server transmits the optimal putting trajectory to at least one local server, and the local server stores the received optimal putting trajectory (S103).

Afterwards, when the ball is located at a preset position on the putting field, an image of the position of the ball on the putting field is transmitted to the local server, and the optimal putting trajectory is received from the local server and projected onto the putting field through a projector (S104).

The present disclosure provides a method for providing an optimal putting path and a system thereof, such that one server of the system including a plurality of servers such as the main server and the local server performs the service operation of a complex process, and the other servers perform comparatively simple operations such as storage and retrieval, and thereby operations previously performed on a store terminal may be performed by the servers on behalf of the store terminal.

Through this, the store terminal of the present disclosure may be more compact and simplified than terminals that have been used in the past, or may provide a putting training service of superior quality even though it is a terminal of the same standard.

Furthermore, in the store terminal, the unit cost of production and supply of the store terminal may be reduced and space utilization may be improved by performing only functions that are much simpler than those performed by conventional terminals, such as the functions of collecting and transmitting images of the putting field, and thereby terminals with excellent design may be placed in stores.

In addition, an external server collects and analyzes the information received from each of the store terminals installed in a plurality of stores and provides a putting trajectory calculated based on this, thereby providing high quality service to each of the stores in a uniform manner. Therefore, it is possible to solve the problem of imbalance between stores where some stores have poor service quality and others have excellent service quality.

An embodiment of the present disclosure may also be implemented in a form of a recording medium containing instructions executable by a computer, such as program modules executed by a computer. Computer-readable media may be any available media that may be accessed by a computer and may include all of volatile and non-volatile media, removable and non-removable media. In addition, computer-readable media may include all computer storage media. Computer storage media includes all volatile and non-volatile, removable and non-removable media implemented in any method or technology for storage of information such as computer-readable instructions, data structures, program modules, or other data.

Although the methods and systems of the present disclosure have been described with respect to specific embodiments, some or all of their components or operations may be implemented using a computer system having a general-purpose hardware architecture.

The description of the present disclosure described above is for illustrative purposes, and those skilled in the art will understand that the present disclosure may be easily modified into other specific forms without changing the technical idea or essential features of the present disclosure. Therefore, the embodiments described above should be understood in all respects as illustrative and not restrictive. For example, each component described as a single type may be implemented in a distributed manner, and similarly, components described as distributed manner may also be implemented in a combined form.

The scope of the present disclosure is indicated by the claims described below rather than the detailed description above, and all changes or modified forms derived from the meaning and scope of the claims and their equivalent concepts should be construed as being included in the scope of the present disclosure.

What is claimed is:

1. A method for providing an optimal putting path comprising:
   (a) Collecting data about a putting field of each store from at least one store terminal and performing a simulation of putting performed at a plurality of positions within the putting field installed in each store by a main server;
   (b) Selecting trajectory data of a ball entering a hole cup among trajectory data for a plurality of balls derived from a simulation result of the main server and selecting an optimal putting trajectory from the selected trajectory data;
   (c) Transmitting the optimal putting trajectory to at least one local server by the main server and storing the received optimal putting trajectory by the local server; and
   (d) Transmitting an image of the position of the ball on the putting field is to the local server when the ball is located at a preset position on the putting field, receiving the optimal putting trajectory from the local server, and projecting the optimal putting trajectory onto the putting field through a projector.

2. The method for providing an optimal putting path of claim 1, wherein in (a),
   the simulation is performed in a way of calculating a plurality of trajectory data by calculating the trajectory of the ball by considering a friction force and a slope of the putting field when the ball is hit in all possible hitting directions to be executed without specifying a direction of a putter at a plurality of preset putting start positions.

3. The method for providing an optimal putting path of claim 2, wherein in (a),
   when the ball is hit in one direction, the trajectory of the ball is calculated by hitting the ball with all the hitting forces capable of being to be performed at a specific hitting force interval from the minimum value to the maximum value of a preset hitting force.

4. The method for providing an optimal putting path of claim 2, wherein in (a),
   the simulation is performed by considering putting field parameters including a height, a slope, and a friction force for each section of a terrain that constitutes the putting field pre-stored in the main server.

5. The method for providing an optimal putting path of claim 1, wherein in (b),
   trajectory data located in the middle in order is selected as the optimal putting trajectory among a plurality of trajectory data corresponding to data between a result value with the minimum value and a result value with the maximum value of a slope of the putting field in a direction from the position of the ball to the hole cup, among result values of the performed simulation data by considering a time taken for the hit ball to reach the hole cup, a distance for the hit ball to reach the hole cup, and a curvature of the trajectory of the hit ball until the hit ball reaches the hole cup among the plurality of trajectory data.

6. The method for providing an optimal putting path of claim 1, wherein each optimal putting trajectory is matched with a putting start position of the ball and stored.

7. The method for providing an optimal putting path of claim 1, (d) includes
   (d-1) photographing the putting field with a camera device and transmitting an image including the positions of the ball and the hole cup to the local server by the store terminal;
   (d-2) recognizing the positions of the ball and the hole cup in the received image received by the local serve; and
   (d-3) searching for the optimal putting trajectory corresponding to the positions of the ball and the hole cup recognized by the local server, and projecting the searched optimal putting trajectory by the projector.

8. The method for providing an optimal putting path of claim 7, wherein in (d-3),
   the optimal putting trajectory is projected and displayed in a solid line extending from the position of the ball to the position of the hole cup recognized by the local server, and an entire trajectory of the optimal putting trajectory is provided at once before the actual putting is made.

9. The method for providing an optimal putting path of claim 7, wherein in (d-3),
   the optimal putting trajectory is projected and displayed in a solid line extending from the position of the ball to the position of the hole cup recognized by the local server, and the optimal putting trajectory is sequentially generated and provided along with the actual trajectory drawn by the ball as the ball moves after the actual putting is made.

10. The method for providing an optimal putting path of claim 1, further comprising:
    (d-0) providing a training condition UI for setting training conditions by the local server, receiving the training conditions from a user terminal, and projecting the position of the ball to be hit onto the putting field before (d); and
    (d+0) collecting the trajectory and hitting results of the ball hit by a user by the local server and visualizing statistics thereof to be provided after (d).

11. The method for providing an optimal putting path of claim 10, wherein in (d),
    when receiving a pattern test request from the user terminal, pattern test training is provided through a pattern test UI,
    the pattern test UI includes:
    a training condition UI which is provided in (d+0) and receives setting for a plurality of putting distances to be trained, a training order of the putting distances, a progress direction of a section to be trained for a preset section of the putting field, and a time limit during training from the user terminal;
    a training progress UI which is provided in (d) and with which training is conducted according to the training conditions received through the training condition UI, and which provides a training progress of the training through dividing of the training progress into before progress, in progress, putting success, and putting failure, and displaying those in different colors on preset sections of the putting field; and
    a training result UI that is provided in (d+1), provides training classification number, training date and time, number of putts attempted in the training, number of successful putts, number of failed putts, putting success rate, average return distance of the hit ball, and total return distances, in a table, after the training ends, provides the success rate for each breaking line depending on a preset breaking line and a pitch quality of the hit ball, in a polygonal graph, displays the training conditions for the training, and provides an average start tendency and a speed tendency over time of the balls hit during the training, in a bar-type graph, and
    the putting field has a plurality of preset slopes and includes breaking lines distinguished by 'Down' when the slope is downward, 'Up' when the slope is upward, and 'Flat' when the slope is flat.

12. The method for providing an optimal putting path of claim 11, wherein,
when the putting field is circular, the training progress UI divides the putting field into 12 sections with the same area and divides the 12 sections each into 3 sections such that the putting field is formed to include a total of 36 sections.

13. The method for providing an optimal putting path of claim 11, wherein
when receiving a selection input for the bar-type graph according to the average start tendency of balls hit during the training from the user terminal, the training result UI provides the breaking line corresponding to the training performed in each section, the ball's direction of movement, and the ball's hitting position according to the trained putting distance in each section for hits performed in at least one of the 36 sections on the putting field, in a bar-type graph, and
the hitting position of the ball is displayed as a scale within the bar in which a side with a low slope of the terrain is designated as 'Low', and a side with a high slope is designated as 'High' based on a straight line between the ball where the putting is performed and the hole cup.

14. The method for providing an optimal putting path of claim 11, wherein,
when receiving a selection input for the bar-type graph according to the average speed tendency of balls hit during the training from the user terminal, the training result UI provides the direction and the speed of the ball hit for each putting distance corresponding to the training performed in each section for hits performed in at least one of 36 sections on the putting field, and the breaking line formed by combining at least two of the 36 sections on the putting field
and the pitch quality of the hit ball are classified into at least one of 'Straight', 'Hook', and 'Slice', and displayed together.

15. The method for providing an optimal putting path of claim 10, wherein,
in (d–0), settings for the plurality of putting distances to be trained, the training order of the putting distances, a progress direction of a section to be trained for a preset section of the putting field, and a time limit during training is received from the user terminal through the training condition UI,
in (d), as training progresses according to the received training conditions, the training progress for the training through the training progress UI is displayed on the user terminal by dividing the training progress into before progress, in progress, putting success, and putting failure to be displayed in different colors on preset sections of the putting field, and
in (d+0), after the training ends, for the training, all statistical information about training classification number, training date and time, number of putts attempted in the training, number of successful putts, number of failed putts, putting success rate, average return distance of the hit ball, total return distances, success rate for each breaking line depending on a preset breaking line and a pitch quality of the hit ball, training conditions for the training, and the average start tendency and speed tendency over time of balls hit during the training is displayed on the user terminal.

16. The method for providing an optimal putting path of claim 11, wherein
the training result UI further includes a stroke result UI that provides success or failure of the putting attempted in the training through displaying the success or failure in different color according to the section of the putting field after the training is completed, and provides a stroke time of the attempted putting in each section through displaying the stroke time in number, and
the stroke time is a time until just before the ball is hit from when the ball is recognized from the server during training and a preset training start signal is generated.

17. An optimal putting path providing system comprising:
a putting field that is installed in a plurality of stores and where putting for a ball is performed;
a store terminal that is installed in a plurality of stores, collects data about the putting field with a camera device, and provides the collected data to a main server;
the main server that receives data about the putting field from the store terminal, performs a simulation of the putting performed at a plurality of positions within the putting field installed in each store, selects trajectory data of the ball entering a hole cup among trajectory data for a plurality of balls derived from simulation results, selects an optimal putting trajectory from the selected trajectory data, transmits the optimal putting trajectory to a local server, transmits an image of the position of the ball on the putting field when the ball is located at a preset position on the putting field, receives the optimal putting trajectory from the local server, and controls at least one of projects to project the optimal putting trajectory onto the putting field;
at least one local server that stores the optimal putting trajectory received from the main server; and
a projector that projects at least one putting trajectory onto the putting field under the control of the main server.

\* \* \* \* \*